(12) United States Patent
Machida et al.

(10) Patent No.: US 6,334,304 B1
(45) Date of Patent: Jan. 1, 2002

(54) DEGRADATION DISCRIMINATION SYSTEM OF INTERNAL COMBUSTION ENGINE EXHAUST GAS PURIFICATION SYSTEM

(75) Inventors: Kei Machida; Tetsuo Endo; Shiro Takakura; Yuji Yasui, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/551,170

(22) Filed: Apr. 17, 2000

(30) Foreign Application Priority Data

Apr. 16, 1999 (JP) .......................................... 11-109449

(51) Int. Cl.⁷ ................................................ F01N 3/00
(52) U.S. Cl. .......................... 60/274; 60/277; 60/287; 60/297; 60/324
(58) Field of Search .......................... 60/274, 278, 284, 60/288, 287, 297, 299, 292, 300, 324, 311, 277

(56) References Cited

U.S. PATENT DOCUMENTS

| | | | |
|---|---|---|---|
| 5,315,824 A | * | 5/1994 | Takeshima .................. 60/297 |
| 5,524,433 A | * | 6/1996 | Adamczyk et al. ........... 60/276 |
| 5,738,832 A | * | 4/1998 | Dogahara et al. ........... 422/171 |
| 5,761,902 A | * | 6/1998 | Usami et al. ................. 60/288 |
| 5,979,157 A | * | 11/1999 | Kinugasa et al. ............. 60/274 |
| 6,012,284 A | * | 1/2000 | Tanaka et al. ................ 60/297 |
| 6,047,544 A | * | 4/2000 | Yamamoto et al. ........... 60/285 |
| 6,170,260 B1 | * | 1/2001 | Ishii et al. .................... 60/297 |

* cited by examiner

Primary Examiner—Thomas Denion
Assistant Examiner—Binh Tran
(74) Attorney, Agent, or Firm—Arent Fox Kintner Plotkin & Kahn, PLLC

(57) ABSTRACT

A system for discriminating degradation of an exhaust purification system of an internal combustion engine having an adsorbent installed at a bypass exhaust gas passage adsorbing unburned HC in exhaust gas generated by the engine. Based on the assumption that the degradation of the adsorbent made from zeolite progresses or advances depending on its temperature, the temperature is detected and if it exceeds a predetermined temperature, an index indicative of the degree of degradation progress is determined based on a surplus exceeding the predetermined temperature. The index is accumulated to be compared with a threshold value and the adsorbent is discriminated to be degraded when the accumulated index exceeds the threshold value, thereby enabling to discriminate the adsorbent degradation accurately with a simple configuration.

28 Claims, 13 Drawing Sheets

FIG.5

| ZEOLITES | PORE SIZE | C2H6 ETHANE | C3H8 PROPANE | C5H12 PENTANE | C7H8 TOLUENE | C8H18 ISOOCTANE |
|---|---|---|---|---|---|---|
| ZSM-5 Ga-MFI [Ag/P-ZSM-5] | | × | △ | ○ | △ | × |
| MORDENITE | | × | × | △ | ○ | ○ |
| Y-TYPE | | × | × | × | △ | ○ |

HC ADSORPTION

ADSORBENT TEMPERATURE RISING

HC DESORBING AND PURGING

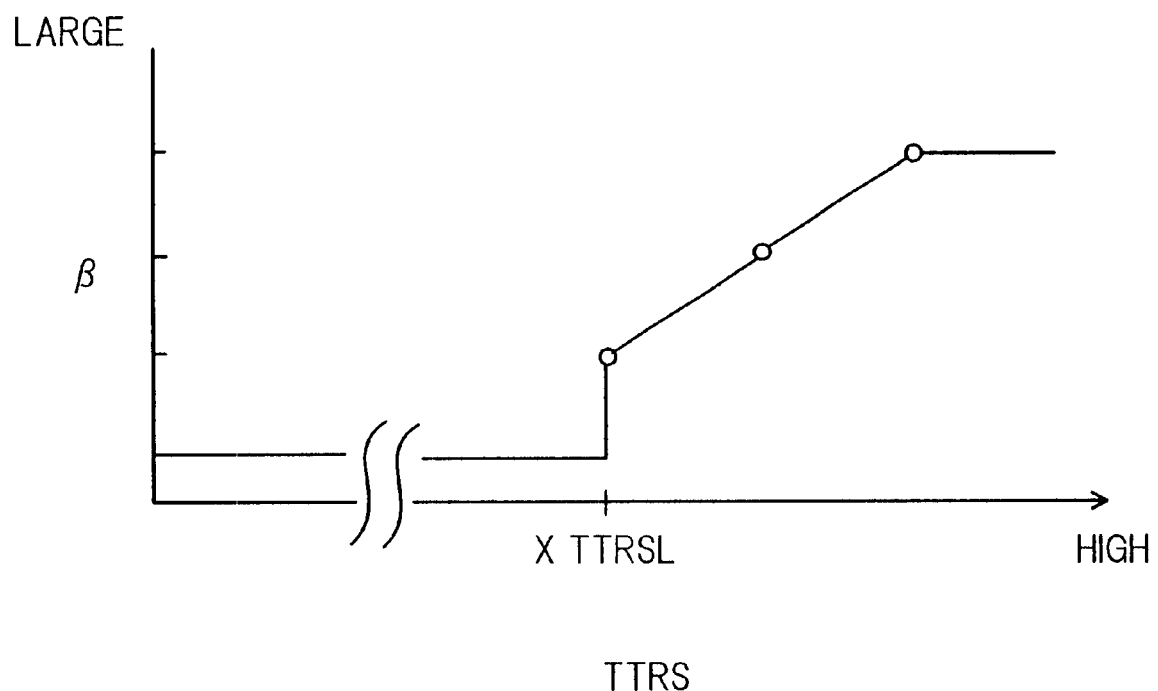

DEGRADATION DISCRIMINATION SYSTEM OF INTERNAL COMBUSTION ENGINE EXHAUST GAS PURIFICATION SYSTEM

BACKGROUND OF THE INVENTION

1. Field of the Invention

This invention relates to a degradation discrimination system of an internal combustion engine exhaust gas purification system, more particularly to a system for discriminating whether an exhaust gas purification system comprising an adsorbent for adsorbing unburned components including the hydrocarbons (HC) in the exhaust gas generated by an internal combustion engine, has degraded or deteriorated.

2. Description of the Related Art

Internal combustion engines are ordinarily provided with a catalyst (a three-way catalytic converter) in the exhaust system which removes HC, NOx and CO components in the exhaust gas generated by the engine. However, when the catalyst is not activated, for example, at the time of engine cold-starting, unburned components of the exhaust gas including unburned HC are released immediately into the atmosphere.

For that reason, there has been proposed an exhaust gas purification system which has an adsorbent made of a zeolite material or some similar material installed in a bypass exhaust gas passage branched from the exhaust pipe at a location downstream of the catalyst, which merges into the exhaust pipe at a downstream point and has a switch-over valve which opens or closes the bypass exhaust gas passage. The switch-over valve opens the bypass exhaust gas passage when the engine is started to introduce the exhaust gas such that the adsorbent adsorbs unburned components including the HC when the catalyst is not activated and closes the bypass exhaust gas passage such that the adsorbent desorbs the adsorbed components and the desorbed components are thereafter recirculated at a position upstream of the catalyst after the catalyst has been activated.

Since a desired exhaust gas purification can not be achieved if any degradation or abnormality arises in such an engine exhaust gas purification system, Japanese Laid-Open Patent Application No. Hei 8 (1996)-93,458, for example, proposes the technique to discriminate whether any degradation or abnormality arises in the system. Another Japanese Laid-Open Patent Application, No. Hei 8 (1996)-218, 850 proposes a similar technique.

Specifically, Japanese Laid-Open Patent Application No. Hei 8 (1996)-93, 458 proposes providing an HC sensor at a position downstream of the bypass exhaust gas passage for detecting the HC concentration of the exhaust gas at that location. In this prior art, the HC sensor detects the HC concentration in the adsorption mode and in the desorption mode respectively. The detected values are compared with predetermined values and based on the result of the comparison, it is discriminated whether any trouble has occurred in a mechanical part such as a switch-over valve.

In addition, this prior art proposes providing the HC sensor at a recirculation passage to determine the total amount of HC being recirculated, and by comparing the determined amount with a predetermined value, it discriminates whether any trouble has occurred in a mechanical part such as a valve for opening/closing the recirculation passage.

Japanese Laid-Open Patent Application No. Hei 8 (1996)-218,850 proposes providing $O_2$ sensors at a position upstream of the adsorbent, but downstream of the catalyst and at a position upstream of the recirculation passage. In this prior art, a time lapse until the rich/lean signals of both the sensors become equal to each other is measured and based on the measured time, it discriminates whether any abnormality arises in the system such as at the adsorbent.

Specifically, based on the assumption that the air/fuel ratio in the recirculation passage becomes richer than that at a position downstream of the adsorbent since the desorbed HC is recirculated together with the exhaust gas, but becomes equal to the air/fuel downstream of the adsorbent after the desorbed HC has been purified, the second prior art conducts the discrimination by measuring the time lapse until the outputs of the air/fuel ratio sensors coincide. Similarly, the second prior art proposes providing an HC sensor, instead of the oxygen sensor, to discriminate the occupance of any abnormality based on the HC concentration in the desorption mode.

Although the first prior art mentioned in Japanese Laid-Open Patent Application No. Hei 8 (1996)-93, 458 monitors the behavior of HC directly through the HC sensor, the first prior art can not discriminate whether the abnormality has occurred in the adsorbent or any other part such as switch-over valve. In other words, the first prior art can not discriminate the abnormality or degradation arising in the adsorbent accurately.

The second prior art mentioned in Japanese Laid-Open Patent Application No. Hei 8 (1996)-218, 850 can similarly discriminate the abnormality or degradation arising in the system including the adsorbent by detecting the HC concentration in the desorbtion mode. However, since the second prior art does not detect the concentration or amount of HC flowing into and adhering to the adsorbent in the adsorption mode, the second prior art is not always satisfactory in the discrimination accuracy if there are variances in the amount of HC. The same argument will also be applied in a case when the amount of recirculation fluctuates.

Moreover, the second prior art needs the oxygen concentration or HC concentration at the locations upstream of the adsorbent (downstream of the catalyst) and upstream of the recirculation passage and the time lapse until both of the detected values become equal to each other at the time of recirculation, rendering the system configuration complicated.

SUMMARY OF THE INVENTION

An object of the invention is therefore to provide a degradation discrimination system of an internal combustion engine exhaust gas purification system having an adsorbent installed in the exhaust system to adsorb unburned HC components in the exhaust gas generated by the engine, which enables to discriminate the degradation or deterioration of the adsorbent accurately with a simple configuration.

In order to achieve the object, there is provided a system for discriminating degradation of an exhaust purification system of an internal combustion engine having an adsorbent installed at a bypass exhaust gas passage adsorbing unburned HC in exhaust gas generated by the engine, comprising; adsorbent temperature detecting means for detecting a temperature of the adsorbent; accumulated time period determining means for accumulating a period of time during which the detected adsorbent temperature exceeds a predetermined temperature; and adsorbent degradation discriminating means for discriminating whether the adsorbent has degraded based on the accumulated period of time.

BRIEF EXPLANATION OF THE DRAWINGS

The objects and advantages of the invention will become more apparent from the following descriptions and drawings, in which:

FIG. 5 is a chart showing the property of zeolites (to be used as a material for an adsorbent illustrated in FIG. 1) relative to HC compounds in the exhaust gas generated by the engine;

FIG. 13 is a view, similar to FIG. 9, but showing a characteristic of an index indicative of the degree of degradation progress referred to in the flow chart of FIG. 12.

PREFERRED EMBODIMENTS OF THE INVENTION

Embodiments of the invention will now be explained with reference to the drawings.

Figure 1:
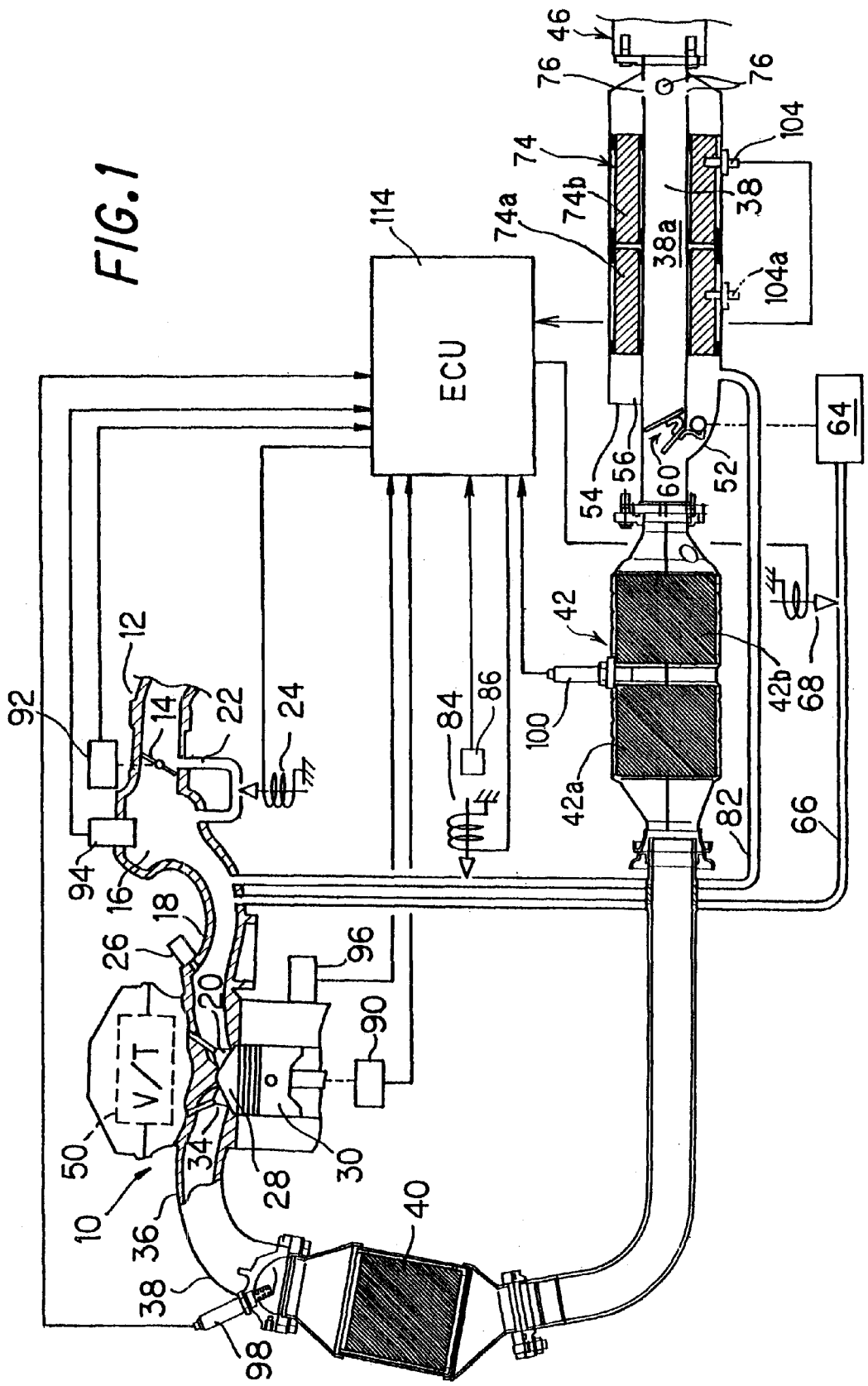
FIG. 1 is a schematic view showing the overall configuration of a degradation discrimination system of an internal combustion engine exhaust gas purification system according to a first embodiment of the invention.

FIG. 1 is a view schematically showing the overall configuration of a degradation discrimination system of an internal combustion engine exhaust gas purification system according to an embodiment of the invention.

Reference numeral 10 in this figure designates an overhead cam (OHC) in-line four-cylinder internal combustion engine. Air drawn into an air intake pipe or passage 12 through an air cleaner (not shown) mounted separately is supplied to the fast to fourth cylinders (only one is shown) through a surge tank 16, an intake manifold 18 and two intake valves 20 (only one is shown), while the flow thereof is adjusted by a throttle valve 14 and is supplied to the first to four cylinders of the engine 10. The throttle valve 14 is bypassed by a bypass 22 provided at the air intake pipe 12. A valve (EACV) 24 comprised of an electromagnetic solenoid valve is installed in the bypass 22 for closing the same.

A fuel injector 26 is installed in the vicinity of the intake valves 20 of each cylinder for injecting fuel for the cylinder concerned. The injected fuel mixes with the intake air to form an air-fuel mixture that is supplied into a combustion chamber 28 and is compressed in the compression stroke and is ignited by a spark plug (not shown). The resulting combustion of the air-fuel mixture drives a piston 30 downwards.

The exhaust gas produced by the combustion is discharged through two exhaust valves 34 (only one is shown) into an exhaust manifold 36, from where it passes through an exhaust pipe or passage 38 to a first catalyst (catalytic converter) 40 installed immediately below the exhaust manifold 36 and a second catalyst 42 comprising a first catalyst bed 42a and a second catalyst bed 42b (all three-way catalytic converters) where noxious components are removed therefrom before it is discharged into the atmosphere via a vehicle rear assembly 46 including a muffler and a tail pipe (neither shown).

The engine 10 is equipped with a variable valve timing mechanism 50 (illustrated as "V/T" in FIG. 1). The variable valve timing mechanism 50 switches the opening/closing timing of the intake and/or exhaust valves between two types of timing characteristics in response to the engine speed NE and the engine load (e.g. the manifold absolute pressure PBA), i.e. a characteristic for low engine speed and a characteristic for high engine speed. The characteristics include one of the two intake valves being operated at a rest position.

The exhaust pipe 38 is connected to a chamber 54, cylindrical in shape, at a location downstream of the second catalyst 42. More specifically, the exhaust pipe 38 is branched off downstream of the second catalyst 42 to form a branch 52. The branch 52 is connected to the chamber 54 which is air-tightly connected to the exhaust pipe 38 to surround the same. With this passages for exhaust gas flow are formed; a main exhaust gas passage 38a passing through the inside of the exhaust pipe 38 and a bypass exhaust gas passage 56 passing through the branch 52 and the inner space of the chamber 54.

Figure 2:
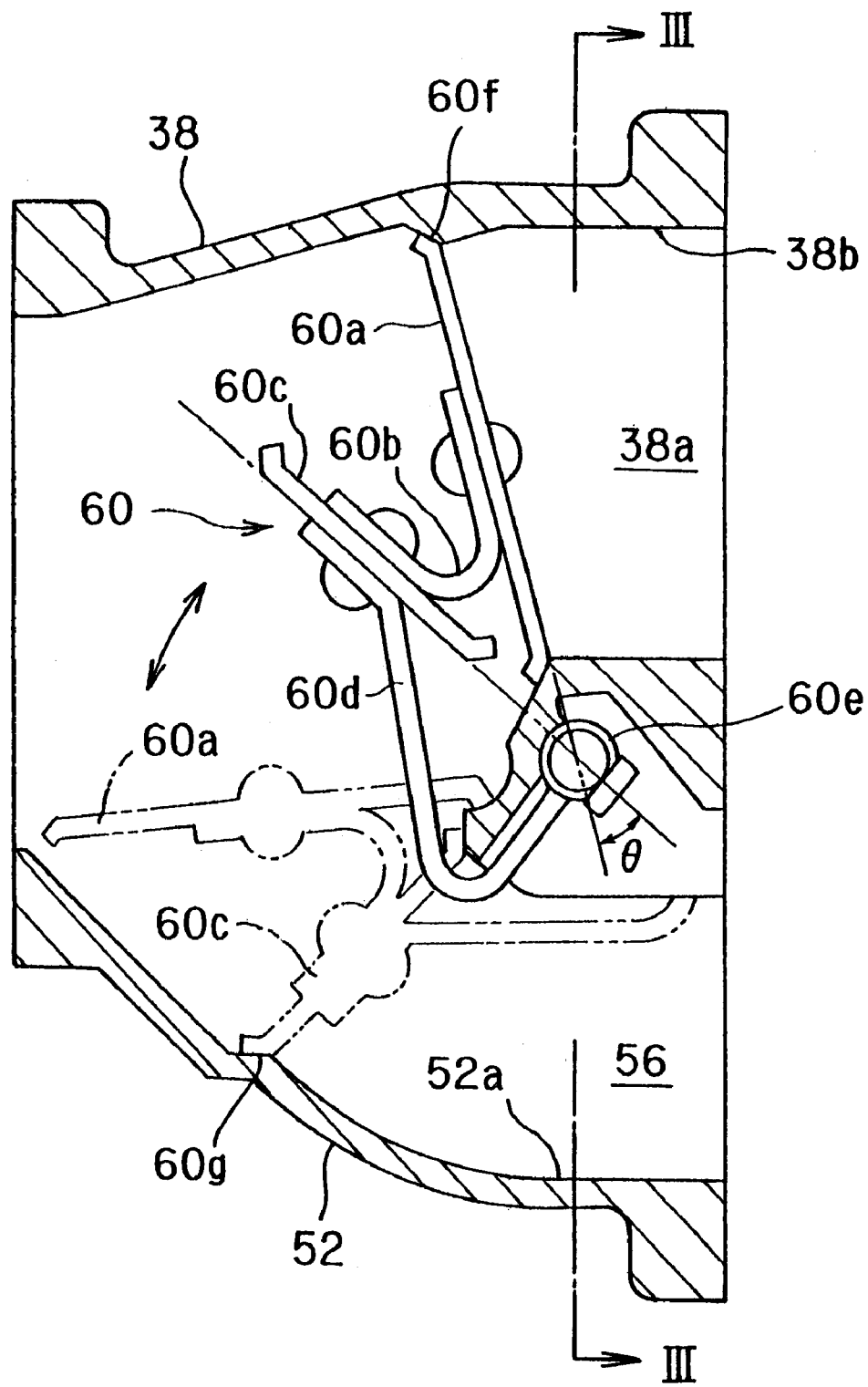
FIG. 2 is an enlarged sectional view of a switch-over valve illustrated in FIG. 1.

A switch-over valve 60 is provided in the vicinity of the branching point at the entrance of the chamber 54. FIG. 2 is an enlarged sectional view of the switch-over valve 60 and FIG. 3 is a sectional view taken along III—III of FIG. 2.

Figure 3:
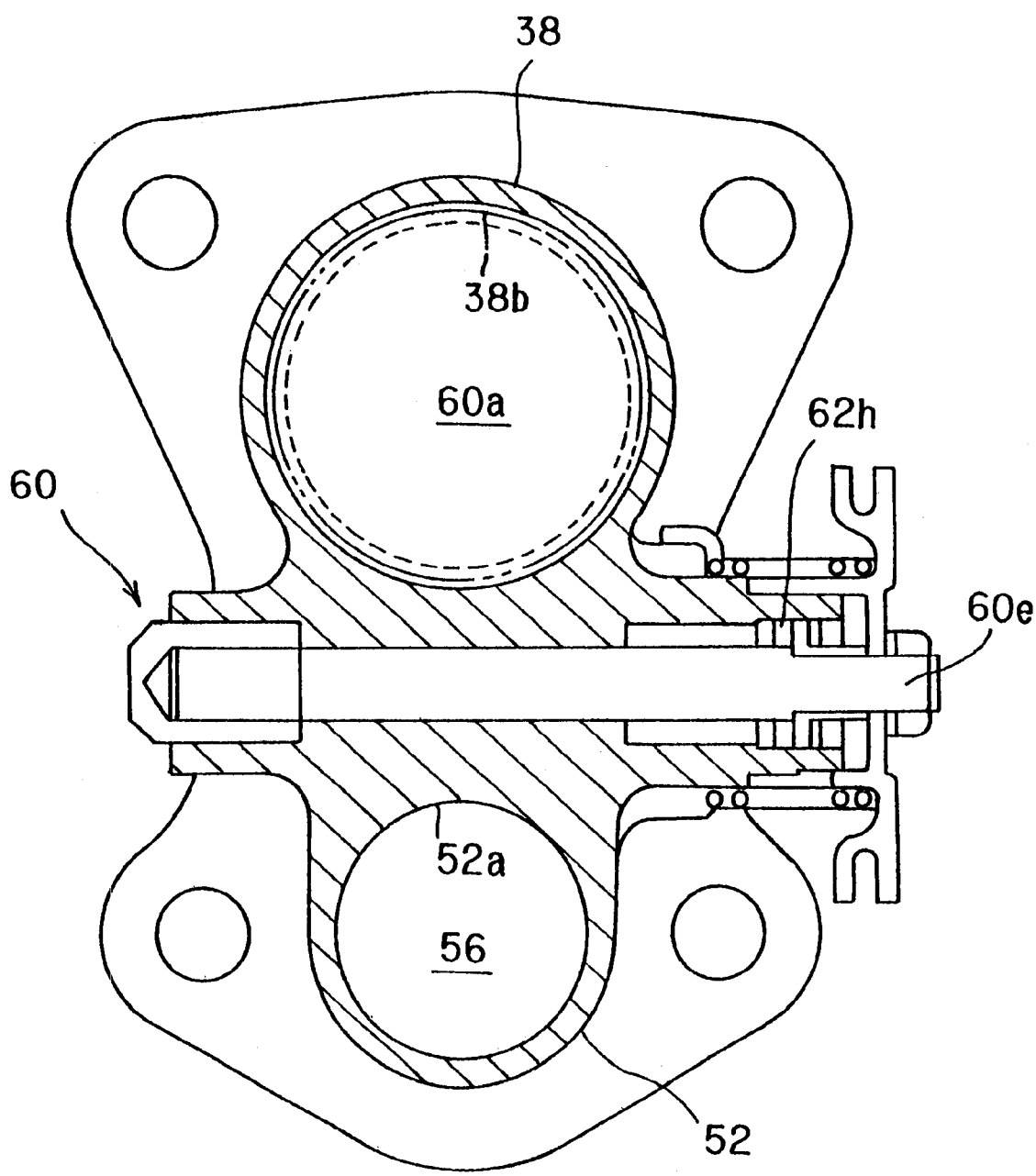
FIG. 3 is a sectional view taken along III—III of FIG. 2.

Explaining the switch-over valve 60 with reference to FIGS. 2 and 3, it comprises a first valve disc 60a which is greater in diameter than the exhaust pipe inner wall 38b defining the main exhaust gas passage 38a, and an arm 60b in an inverted-C shape which connects the first valve disc 60b with a second valve disc 60c which is greater than the diameter of the wall 52a of the branch 52 defining the bypass exhaust gas passage 56. A stem 60d is used to connect the second valve disc 60c to a shaft 60e.

As shown in FIG. 1, the shaft 60e is connected to a valve actuator 64. The valve actuator 64 has a conduit 66 which is connected to the air intake pipe 12 at a location downstream of the throttle valve 14. An electromagnetic solenoid valve (referred later as "TRPV") 68 is installed in the conduit 66, which opens the conduit 66 when energized to introduce the negative pressure therein.

Explaining the valve operation more specifically with reference to FIG. 2, the valve actuator 64 operates to rotate shaft 60e in the position shown by solid lines in the figure when the negative pressure is introduced such that the first valve disc 60a rests on a valve seat 60f to close the main exhaust gas passage 38a (in other words, it opens the bypass exhaust gas passage 56). On the other hand, when the TRPV 68 is deenergized, the conduit 66 is open to the air. As a result, the shaft 60e is returned to a position shown by phantom lines in the figure by a return spring (not shown) such that the second valve disc 60c rests on a valve seat 60g to close the bypass exhaust gas passage 56 (in other words, it opens the main exhaust gas passage 38a).

The second valve disc 60c (and the first valve disc 60a) can be at any position between those illustrated in FIG. 2 by solid lines and phantom lines, by regulating the amount of negative pressure introduced in the conduit by operating the TRPV 68 in such a way that the bypass exhaust gas passage 56 (and the main exhaust gas passage 38a) is opened by a slight amount.

As shown in FIG. 2, the first and second valve discs 60a, 60c are fixed to the shaft 60e at a predetermined angle θ in such a way, that when the first valve disc 60a closes the main exhaust gas passage 38a, the second valve disc 60c is lifted from the valve seat 60g so as not to block the exhaust gas flowing into the bypass exhaust gas passage 56, while, when the second valve disc 60c closes the bypass exhaust gas passage 56, the first valve 60a is lifted from the valve seat 60f so as not to block the exhaust gas flowing into the main exhaust gas passage 38a.

Returning to the explanation of FIG. 1, an adsorbent (HC adsorbing means or HC adsorbing catalyst) 74 is installed at the bypass exhaust gas passage 56 in the chamber 54. The adsorbent 74 comprises a first adsorbent bed 74a (provided upstream, i.e. at a position closer to the branch 52) and a second adsorbent bed 74b (provided downstream, i.e. at a position closer to the vehicle rear assembly 46).

Figure 4:
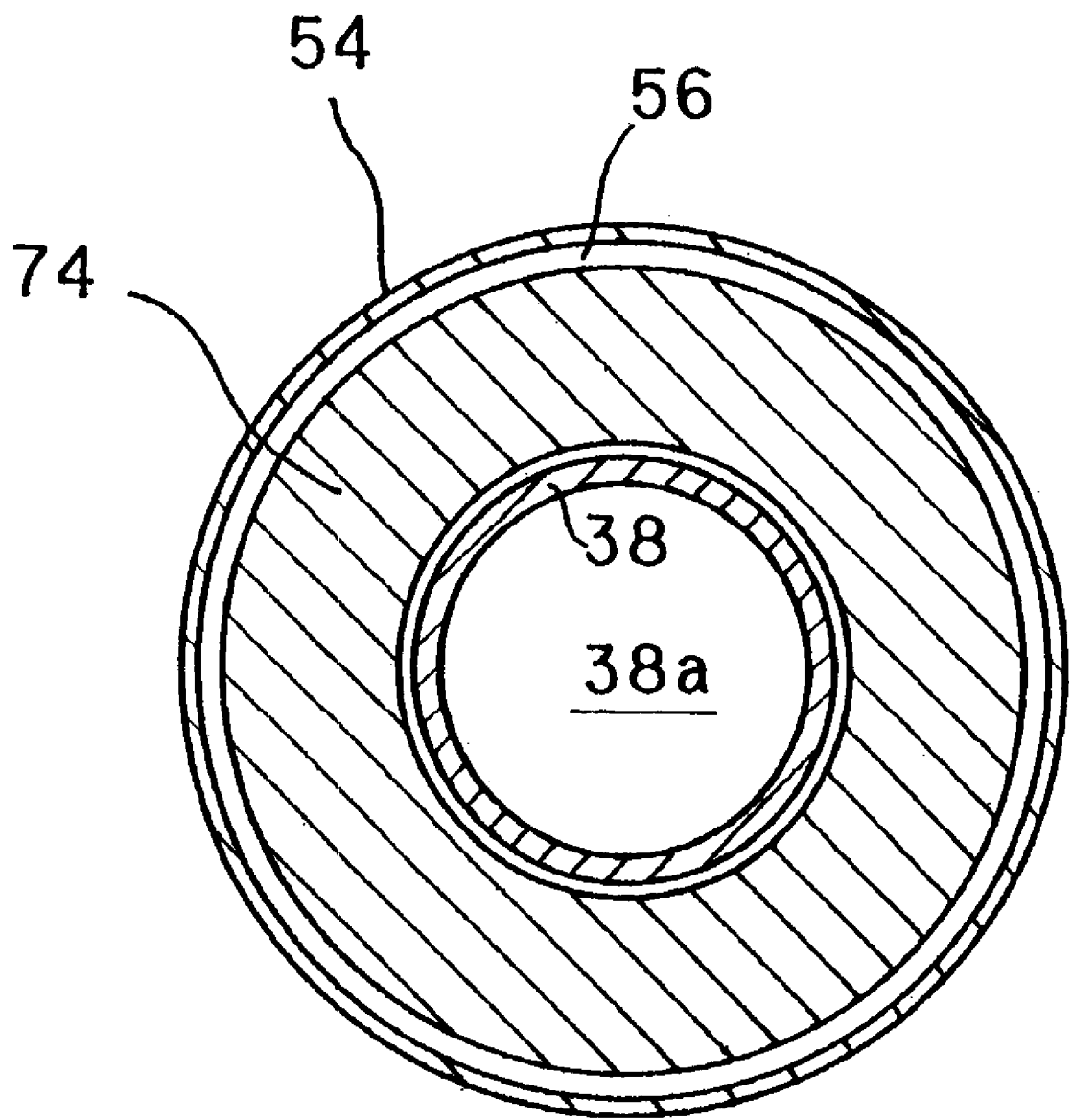
FIG. 4 is a sectional view taken along IV—IV of FIG. 1.

Specifically, as shown in FIG. 4, the chamber 54 is configured to be cylindrical in cross section such that it completely encircles the exhaust pipe 38. More specifically, the adsorbent 74 is positioned close to the exhaust pipe 38 in such a way that the temperature increase of the adsorbent 74 is promoted such that the adsorbed unburned component is desorbed as quickly as possible and is recirculated into the engine intake.

The adsorbent 74 preferably comprises a porous material having a large surface area such as zeolite (the general name of crystalline aluminosilicate or metallosilicate). The adsorbent made from zeolite has small pores or holes in it which are regular in shape and size. The pore sizes are different for different zeolites.

A pore size of 0.2 nm approximately corresponds to the molecular size of HC. The adsorbent made from zeolite adsorbs HC at a low temperature, less than 100° C. and desorbs the adsorbed HC at a higher temperature, ranging from 100° C. to 250° C. These temperatures are different for different kinds of HC (number of carbons) and increase with increasing number of carbons. Moreover, these temperatures vary depending on the kind of zeolites, also.

Explaining here the adsorption, the adsorption is classified into two types, i.e. a mechanical adsorption caused by intermolecular attractions and a chemical adsorption caused by chemical bonds The adsorption in the zeolite adsorbent is mainly the mechanical one. In the mechanical adsorption, the kind (number of carbons) of HC to be adsorbed is determined by the pore size of zeolite constituting the adsorbent.

FIG. 5 is a chart showing the property of zeolites relative to HC compounds in five kinds (number of carbons). In the figure, the symbols indicate the ability of adsorption, i.e. ○: excellent; Δ: medium; x: poor.

Thus, of the various zeolites, an appropriate zeolite or a combination of zeolites such as a combination of Ga-MFI and mordenite should preferably be selected as the adsorbent. Although not shown, some HC compounds such as methane ($CH_4$) will require other kind of zeolites having finer pores.

The adsorbent 74 should be prefabricated from a mixture of selected zeolite(s) and a catalyzer element in a honeycomb structure held in a specially designed metal casing. The adsorbent 74 made from any kind of zeolite exhibits an excellent heat proof (thermal stability) property and does not degrade or deteriorate under a high temperature if the temperature is less than 1100° C. or thereabout. The marginal temperature (beneath of which zeolite does not degrade) differs for different zeolites. If different zeolites are combined to be used, the combination will determine the marginal temperature.

Returning to the explanation of FIG. 1, the exhaust pipe 38 is provided near the end of the chamber 54 (close to the vehicle rear assembly 46) with four holes (confluence points) 76 which are circumferentially located at intervals of 90 degrees. The bypass exhaust gas passage 56 is thus formed from the branch 52 and extends into chamber 54 via the adsorbent 74 up to the holes 76 where it merges into the main exhaust gas passage 38a in the exhaust pipe 38.

The chamber 54 is connected, at or near the entrance, i.e., at a position upstream of the adsorbent 74 and close to the branch 52, to an EGR conduit (passage) 82. The EGR conduit 82 is connected, at the other end, to the air intake pipe 12 at a position downstream of the throttle valve 14. The EGR conduit 82 is provided with an EGR control valve (electromagnetic solenoid valve) 84 which closes the conduit 82 when made ON (energized). A lift sensor 86 is provided in the vicinity of the EGR control valve 84 and generates a signal indicative of the amount of lift (stroke) named "lact" of the valve 84. The lift amount indicates the opening degree of the valve 84.

The exhaust gas purification system comprises the adsorbent 74, the bypass exhaust gas passage 56, the switch-over valve 60, the valve actuator 64, the holes 76, the EGR conduit 82, the EGR control valve 84, etc.

The ignition distributor (not shown) of the engine 10 is provided with a crank angle sensor 90 which generates a signal indicative of Top Dead Center (TDC) of the piston 30 and a signal indicative of unit angles divided into smaller values. The engine 10 is further provided with a throttle position sensor 92 which generates a signal indicative of the degree of opening θ TH of the throttle valve 14, a manifold absolute pressure (MAP) sensor 94 which generates a signal indicative of the aforesaid manifold absolute pressure PBA of the intake manifold downstream of the throttle valve 14 in terms of absolute value and indicative of the engine load, and a coolant temperature sensor 96 installed in the vicinity of a coolant passage (not shown) of the engine which generates a signal indicative of the temperature TW of the engine coolant.

Further, an universal air/fuel ratio sensor 98 (named "LAF sensor") is provided in the exhaust pipe 38 at or downstream of a confluence point of the exhaust manifold 36 and upstream of the first catalyst 40, where it generates a signal indicative of the oxygen concentration in the exhaust gas, as explained later. In addition, an $O_2$ sensor 100 is installed in the exhaust pipe 38 at a location between the first catalyst bed 42a and the second catalyst bed 42b, which generates an ON/OFF signal each time the oxygen concentration in the exhaust gas changes from rich to lean and vice versa.

Furthermore, a temperature sensor 104 is installed at the bypass exhaust gas passage 56 in the chamber 54, more precisely at the second bed adsorbent bed 74b at a location close to its rear end (close to the vehicle rear assembly 46) and generates a signal indicative of the temperature of the adsorbent 74 (the adsorbent temperature is hereinafter referred to as "TTRS"). The sensor may be located at another location such at the medium of front end (close to the first adsorbent bed 74a), or as shown in the figure by the phantom lines with the reference 104a, at the first adsorbent bed 74a.

Furthermore, a valve timing sensor (not shown) is provided in a hydraulic pressure circuit (not shown) of the variable valve timing mechanism 50 and generates a signal indicating which characteristic is selected.

These output signals generated by the sensors are forwarded to an Electronic Control Unit (ECU) 114 comprising a microcomputer.

Figure 6:
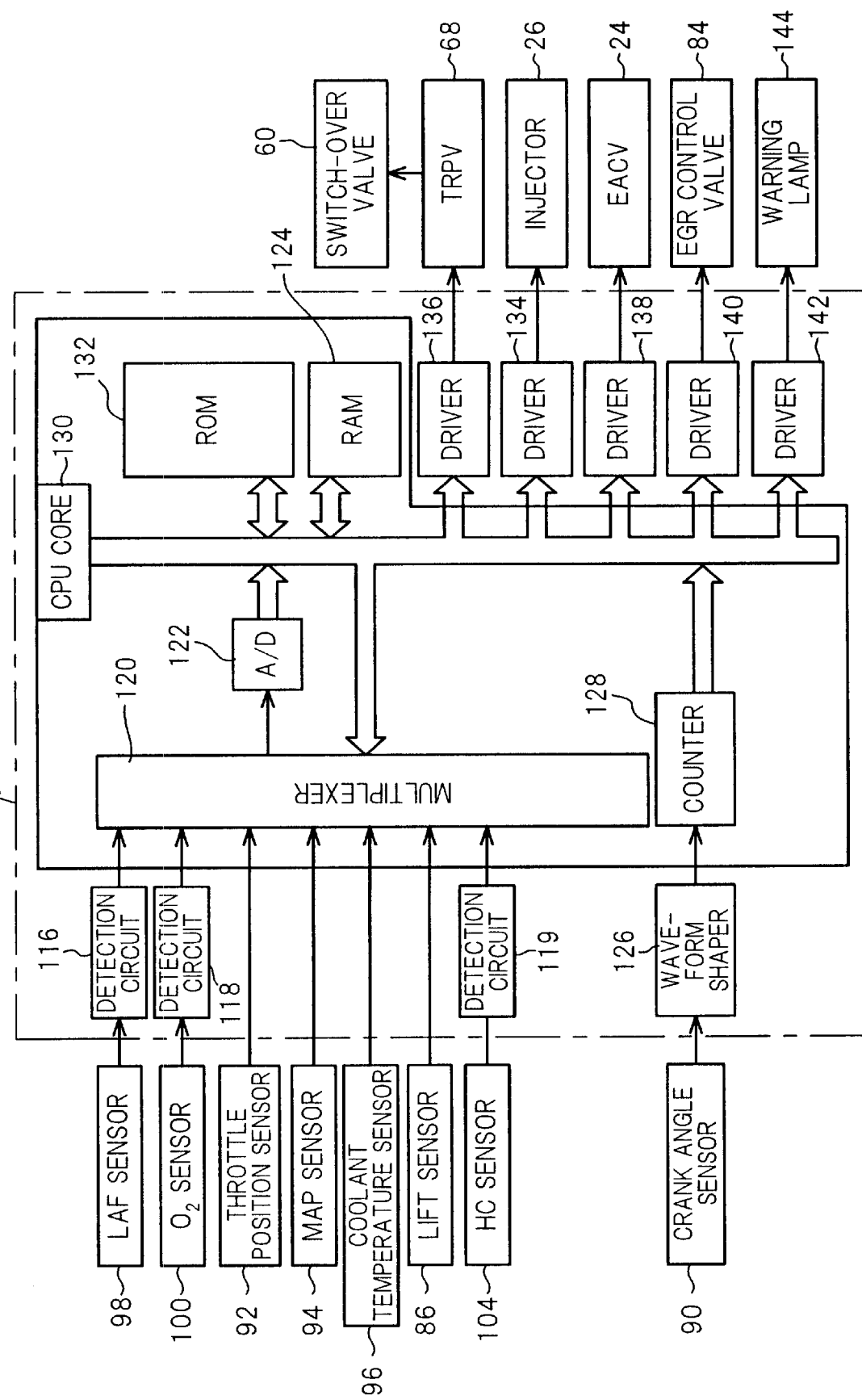
FIG. 6 is a block diagram showing the details of an Electronic Control Unit (ECU) illustrated in FIG. 1.

Details of the ECU 114 are shown in the block diagram of FIG. 6.

The output of the LAF sensor 98 is received by a first detection circuit 116, where it is subjected to appropriate linearization processing for producing an output characterized in that it varies linearly with the oxygen concentration of the exhaust gas over a broad range extending from lean to rich. The output of the $O_2$ sensor 100 is input to a second detection circuit 118 which generates a switching signal indicating that the air/fuel ratio in the exhaust gas emitted from the engine 10 is rich or lean with respect to the stoichiometric air/fuel ratio. The output of the temperature sensor 104 is input to a third detection circuit 119 which generates a signal indicative of the adsorbent temperature TTRS.

The output of these detection circuits 116, 118, 119 are forwarded through a multiplexer 120 and an A/D converter 122 to a RAM (random access memory) 124 in a CPU (central processing unit). Specifically, the CPU has a CPU core 130, a ROM (read-only memory) 132 and the RAM 124, and the output of the detection circuits 116, 118, 119 are A/D-converted and stored in buffers of the RAM 124. The outputs of the analog sensors including the throttle position sensor 92 are similarly input to the CPU via the A/D converter 122 to the RAM 124.

The output of the crank angle sensor 90 is shaped by a wave-form shaper 126 and has its output value counted by a counter 128. The count is inputted into the CPU and the engine speed NE is detected or calculated from the count. In accordance with commands stored in the ROM 132, the CPU core 130 computes a manipulated variable including a basic fuel injection amount TI and an output fuel injection amount TOUT obtained by correcting TI and drives the fuel injectors 26 of the respective cylinders via a driver 134.

The CPU core 130 also drives, via a driver 136, through the electromagnetic valve (TRPV) 68 and the valve actuator 64 (not shown in FIG. 6) to operate the switch-over valve 60, and the CPU core 130 further discriminates whether the adsorbent 74 has degraded or deteriorated. Here, the fact that "the adsorbent 74 has degraded or deteriorated" indicates the HC adsorption or ability of the adsorbent 74 has degraded or degraded.

Furthermore, the CPU core 130 drives the EACV 24 and the EGR control valve 84 through drivers 138, 140. Moreover, the CPU core 130 lights a warning lamp 144 (not shown in FIG. 1) through a driver 142.

Before entering into the operation of the degradation discrimination system of an internal combustion engine exhaust gas purification system according to the embodiment, the operation of the exhaust gas purification system using the adsorbent 74 will be described with reference to FIG. 7.

Figure 7A:
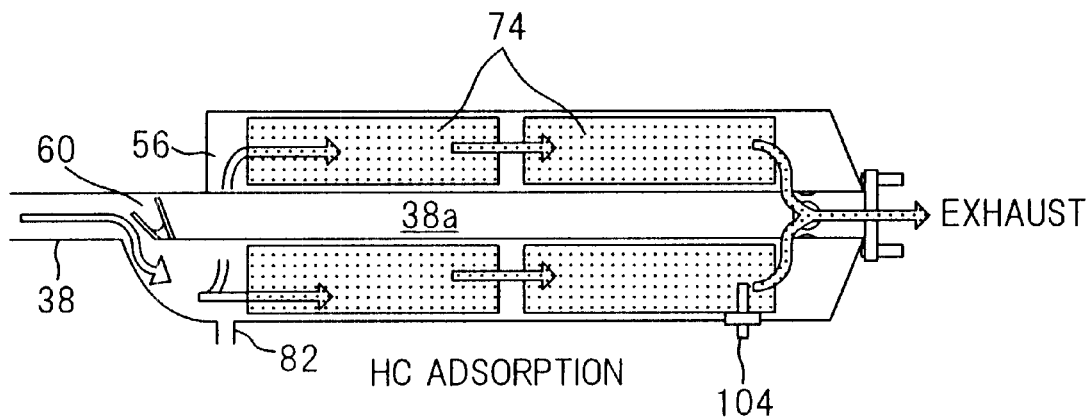
FIGS. 7A–7C are views showing the operation of the exhaust gas purification system including the adsorbent illustrated in FIG. 1.

In the exhaust gas purification system illustrated in the figure, when the engine 10 is cold-started, the switch-over valve 60 is kept in the position shown by the solid lines in FIG. 2 for a predetermined period of time (e.g., 40 sec.) since engine starting such that the main exhaust gas passage 38a is closed, while the bypass exhaust gas passage 56 is opened, as illustrated in FIG. 7A.

Since the first and second catalysts 40, 42 provided upstream of the adsorbent 74 have not been activated during the aforesaid period of time when the engine 10 was cold-started, the exhaust gas is not purified by the catalysts 40, 42. The exhaust gas flows through the bypass exhaust gas passage 56, as shown by arrows in FIG. 7A, and the unburned HC component is adsorbed by the adsorbent 74.

Figure 7B:
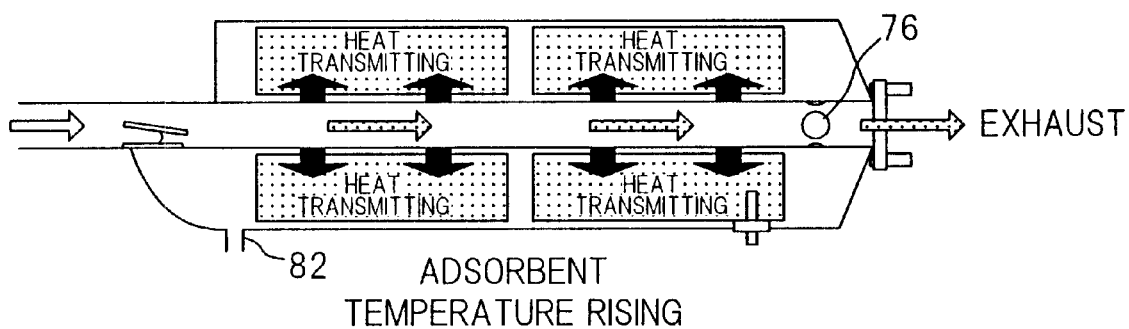

As the upstream catalysts 40, 42 are normally activated after a lapse of the predetermined period of time, the switch-over valve 60 is driven to the position shown by phantom lines in FIG. 2 such that the main exhaust gas passage 38a is opened, while the bypass exhaust gas passage 56 is closed, as illustrated in FIG. 7B.

Accordingly, the exhaust gas purified by the upstream catalysts 40, 42 flows through the main exhaust gas passage 38a and heats the adsorbent 74. As a result, the unburned HC component adsorbed by the adsorbent 74 begins to desorb. Since the pressure of the exhaust gas flowing through the main exhaust gas passage 38a is greater than that flowing through the bypass exhaust gas passage 56, a part or portion of the exhaust gas enters the bypass exhaust gas passage 56 through the holes 76.

Figure 7C:
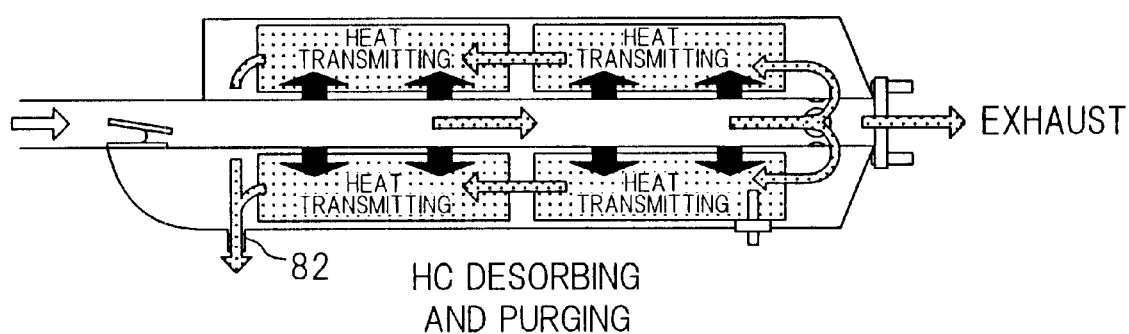

Then as illustrated in FIG. 7C, the desorbed unburned HC component is recirculated back to a position upstream of the first and second catalysts 40, 42, more specifically to the engine intake system through the EGR conduit 82, when the EGR is conducted. At this time, a part or portion of the exhaust gas flowing through the main exhaust gas passage 38a is sucked in by the negative pressure generated at the engine intake system and enters the bypass exhaust gas passage 56 through the holes 76.

The introduced exhaust gas flows through the bypass exhaust gas passage 56 in a direction opposite to that of the exhaust gas flowing through the main exhaust gas passage, while accelerating or expediting the heating of the adsorbent 74, and is recirculated into the engine intake system to be burned once again. The exhaust gas generated by this re-burning is purified by the upstream catalysts 40, 42 and flows out of the engine 10 through the main exhaust gas passage 38a.

Based on the above, the mode of operation of the degradation discrimination system of an internal combustion engine exhaust gas purification system, more specifically, the system for discriminating the degradation of the adsorbent 74, according to the embodiment of the invention will be explained.

Outlining the operation, the inventors noted the fact that the degradation of the adsorbent 74 made from zeolite progresses or advances depending on its temperature, and therefore this invention was made.

Specifically, as mentioned above, the zeolite adsorbent 74 adsorbs and traps HC in the exhaust gas mechanically using its molecular structure. Accordingly, the degradation of the adsorbent, i.e. the degradation of adsorption capacity or ability is dominantly due to the fracture of its crystal structure at a high temperature. This contrasts to conventional catalysts in which the degradation progresses gradually from low temperature.

More specifically, as regards the fracture due to temperature, the zeolite remains stable to a considerable extent such as 1100° C. (the marginal temperature is different in zeolites). The zeolite degrades or deteriorate little until its temperature rises to the marginal temperature. However, once the temperature rises beyond the marginal extent, the fracture of crystal structure begins abruptly.

Since the molecular structure of zeolites is not uniform, the fracture at a high temperature occurs first at a mechanically fragile portion, spreads all over with respect to time and the degradation thus progresses or advances. This indicates that, if the time lapse since the temperature exceeded the marginal extent is measured, the degradation can be discriminated from the measured time lapse. This invention was made based on this.

Figure 8:
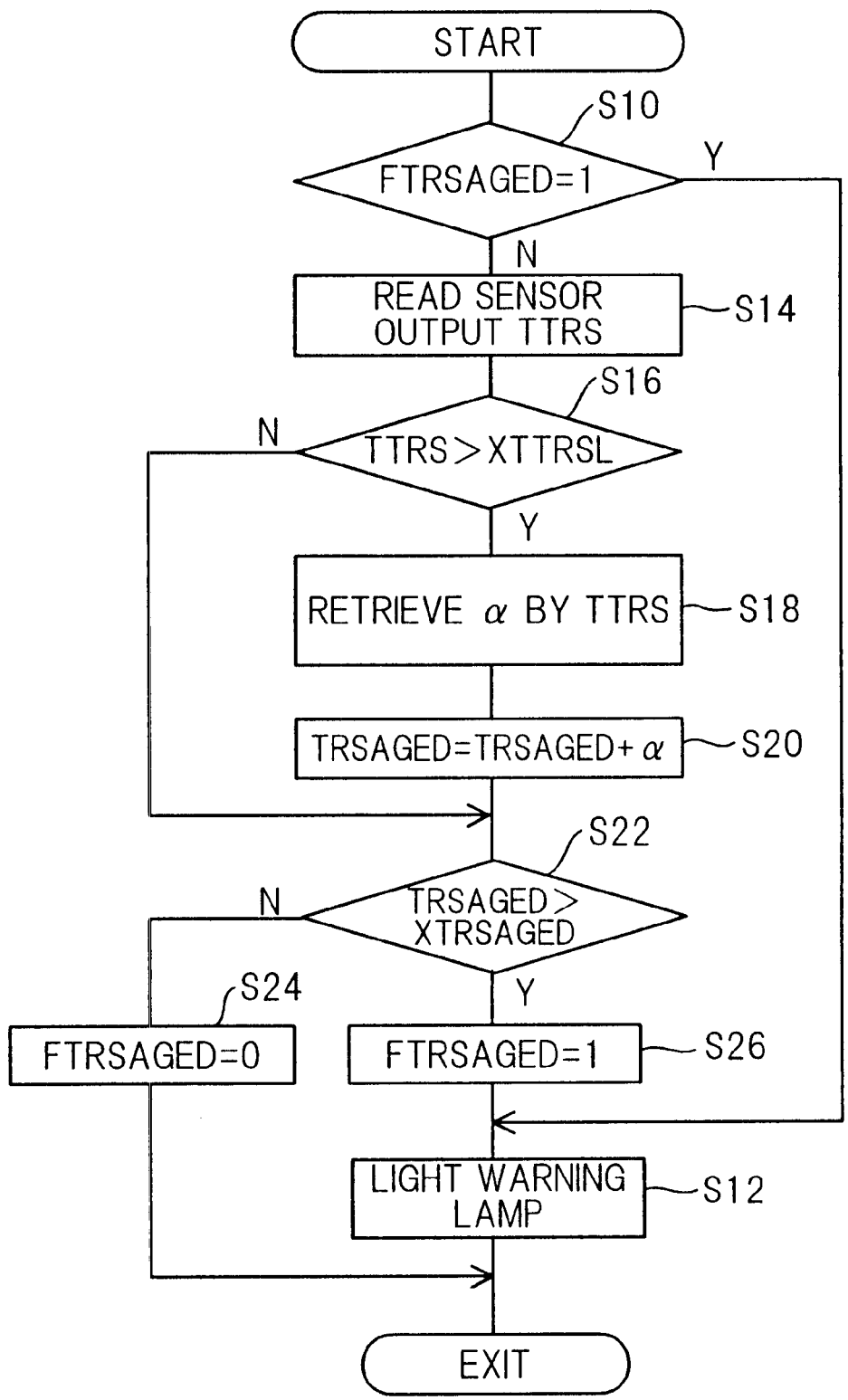
FIG. 8 is a flow chart similarly showing the operation of the system illustrated in FIG. 1.

The operation of the system will be explained with reference to the flow chart of FIG. 8. The program in FIG. 8 is executed when the ignition switch (not shown) is made on and is looped once every 100 msec.

The program begins at S10 in which it is determined whether the bit of a flag FTRSAGED is set to 1. Since the bit of the flag is initially reset to 0 and set to 1 when the adsorbent 74 is discriminated to be degraded as will be mentioned below, the procedure in this step corresponds to determine whether the adsorbent has been discriminated to be degraded. The bit of the flag is stored in a backup portion of the RAM 124 and kept after the engine 10 has been stopped. When the result in S10 is affirmative, the program proceeds to S12 in which the warning lamp 144 is lit and the program is terminated.

On the other hand, when the result in S10 is negative, the program proceeds to S14 in which the output of the temperature sensor 104 indicative of the adsorbent temperature TTRS is read and proceeds to S16 in which the detected adsorbent temperature TTRS is compared with a degradation-beginning threshold value (named "XTTRSL") and it is determined whether the detected adsorbent temperature TTRS exceeds the threshold value XTTRSL. The threshold value XTTRSL should be set to the marginal temperature (e.g. 1100° C.) beyond of which the adsorbent 74 begins to degrade or deteriorate.

Figure 9:
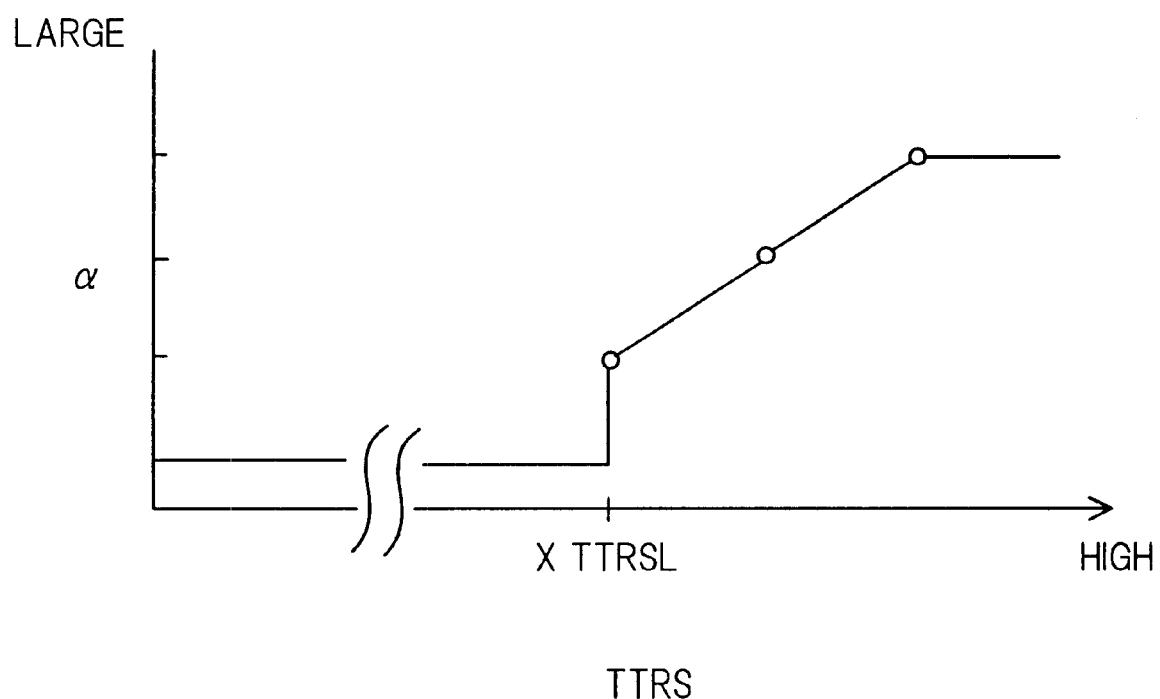
FIG. 9 is a graph showing a characteristic of an index indicative of the degree of degradation progress referred to in the flow chart of FIG. 8.

When the result in S16 is affirmative, the program proceeds to S18 in which a value α is determined by retrieving table data (whose characteristic is shown in FIG. 9) using the detected adsorbent temperature TTRS as address data. The value α is an index indicative of the degree of degradation progress of the adsorbent 74 and is determined in such a way that it increases with increasing surplus (exceeding the marginal temperature XTTRSL).

The program then proceeds to S20 in which the determined value a is added to a degradation discrimination parameter (named "TRSAGED") such that the parameter is updated or accumulated. The parameter is an accumulated period of time value depending on the adsorbent temperature and initially set to zero.

Specifically, since the adsorbent temperature TTRS exceeds the threshold value XTTRSL, it is assumed that the degradation of the adsorbent 74 progresses by an amount corresponding to the detected adsorbent temperature TTRS. This parameter is also stored in the backup portion of the RAM 124 and is kept after the engine 10 has been stopped. When the result in S16 is negative, the program skips S18 and S20.

The program then proceeds to S22 in which the determined parameter TRSAGED is compared with a degradation discrimination threshold value XTRSAGED and it is determined whether the parameter TRSAGE exceeds the threshold value XTRSAGED. In other words, it is determined whether the accumulated period of time since the adsorbent 74 was exposed at a temperature higher than the discrimination beginning temperature, exceeds the degradation discrimination threshold value XTRSAGED set to a value enough to discriminate that the adsorbent 74 has degraded.

When the result in S22 is negative, since this indicates the adsorbent 74 has not degraded, the program proceeds to S24 in which the bit of the flag FTRSAGED is reset to 0.

On the other hand, when the result in S22 is affirmative, since this indicates that the adsorbent has degraded, the program proceeds to S26 in which the bit of the flag FTRSAGED is set to 1 and proceeds to S12 in which the warning lamp 144 is lit to inform the result to the operator.

Thus, based on the fact that the degradation of the adsorbent 74 made from zeolite progresses or advances depending on its temperature, the system according to the embodiment is configured to determine whether the detected adsorbent temperature TTRS exceeds the degradation beginning threshold value XTTRSL, to determine the value α (index indicative of the degree of degradation progress), based on the detected temperature TTRS when the result is affirmative, which is added (accumulated) to the degradation discrimination parameter TRSAGED, and to discriminate whether the adsorbent 74 has degraded by determining whether the accumulated parameter exceeds the degradation discrimination threshold value XTRSAGED. With this, the system is simple in configuration, but can accurately discriminate the degradation of the adsorbent 74.

Further, the threshold values XTTRSL and XTRSAGED can be easily determined through experimentation. The first threshold value XTTRSL should be set to the marginal temperature such as 1100° C. or thereabout. The second threshold value XTRSAGED should be set to a value enough for enabling to discriminate the adsorbent degradation through experimentation, taking into account the control cycle (program loop interval (i.e. 100 msec.) of the flow chart of FIG. 8).

Furthermore, the kinds of parameters used there are only temperature and period of time, which facilitates the measurement and calculation and hence, decreases errors which would otherwise occur.

Furthermore, since the zeolite adsorbent 74 begins to degrade abruptly at a high temperature exceeding the marginal temperature (XTTRSL) by an extent corresponding to the surplus, the value a is determined as the index indicative of the degree of degradation progress in such a manner that it increases with increasing surplus, and is added to the accumulated degradation discrimination parameter TRSAGED. To be more specific, since the degradation discrimination parameter is determined in such a way that it increases with increasing adsorbent temperature, the parameter can be accurately determined in response to the degree of degradation progress, thereby further enhancing the degradation discrimination accuracy.

Figure 10:
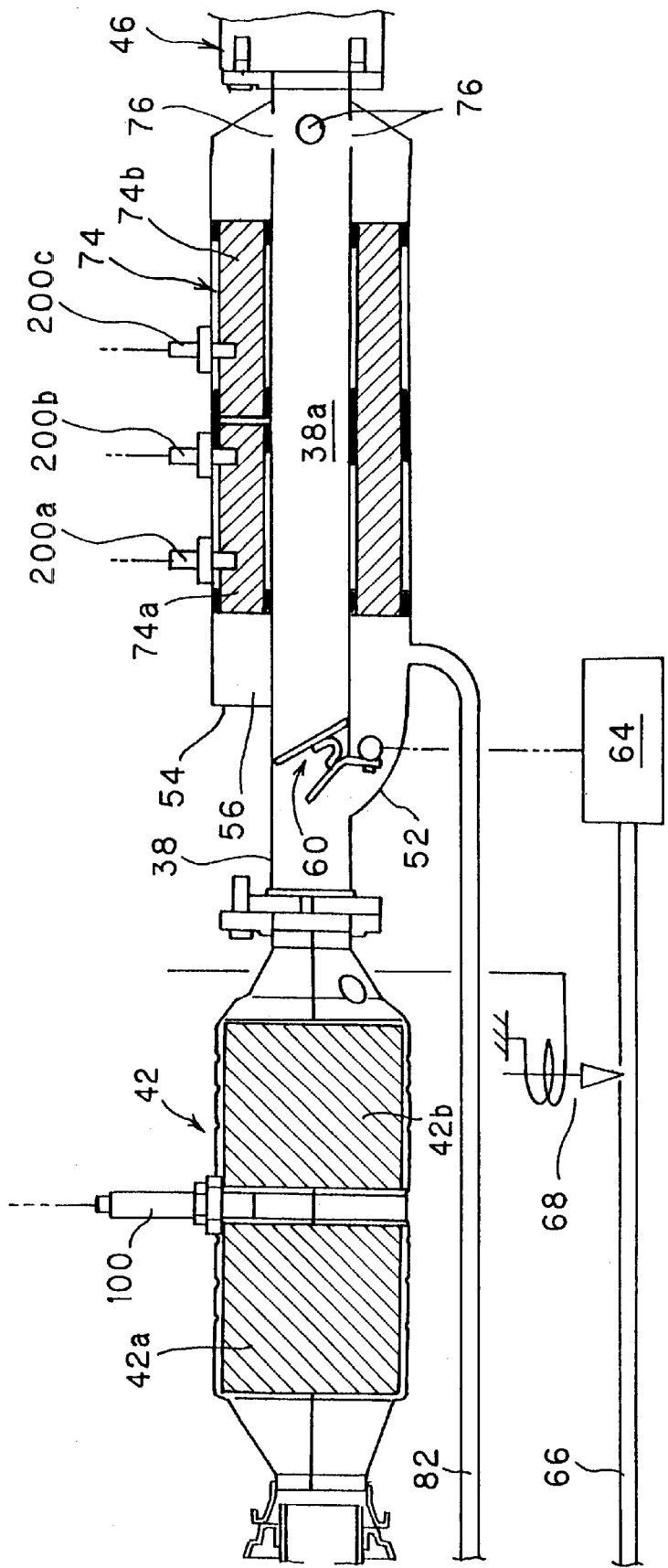
FIG. 10 is a view, partially similar to FIG. 1, but showing the configuration of the degradation discrimination system of an internal combustion engine exhaust gas purification system according to a second embodiment of this invention.

FIG. 10 is a cross sectional view of the portion downstream of the first and second catalysts 40, 42 showing a partial configuration of a degradation discrimination system of an internal combustion engine exhaust gas purification system according to a second embodiment of the invention.

In the second embodiment, as illustrated in the figure, instead of the temperature sensor 104, three temperature switches (or fuses) 200 are installed at the adsorbent 74. Specifically, the temperature switches comprising a first temperature switch 200a, a second switch 200b and a third temperature switch 200c are installed at the first and second adsorbent beds 74*a*, 74 from the upstream side to the downstream (in terms of the exhaust gas stream) spaced apart by a predetermined distance.

These temperature switches 200 are configured to change their outputs from OFF to ON state in response to the temperature at their location. Specifically, when the adsorbent temperature rises to 1100° C., the output of the first switch 200*a* turns from OFF to ON state. When it rises to 1150° C., the output of the second switch 200*b* turns from OFF to ON state and when it rises to 1200° C., that of the third switch 200*c* turns from OFF to ON state.

Figure 11:
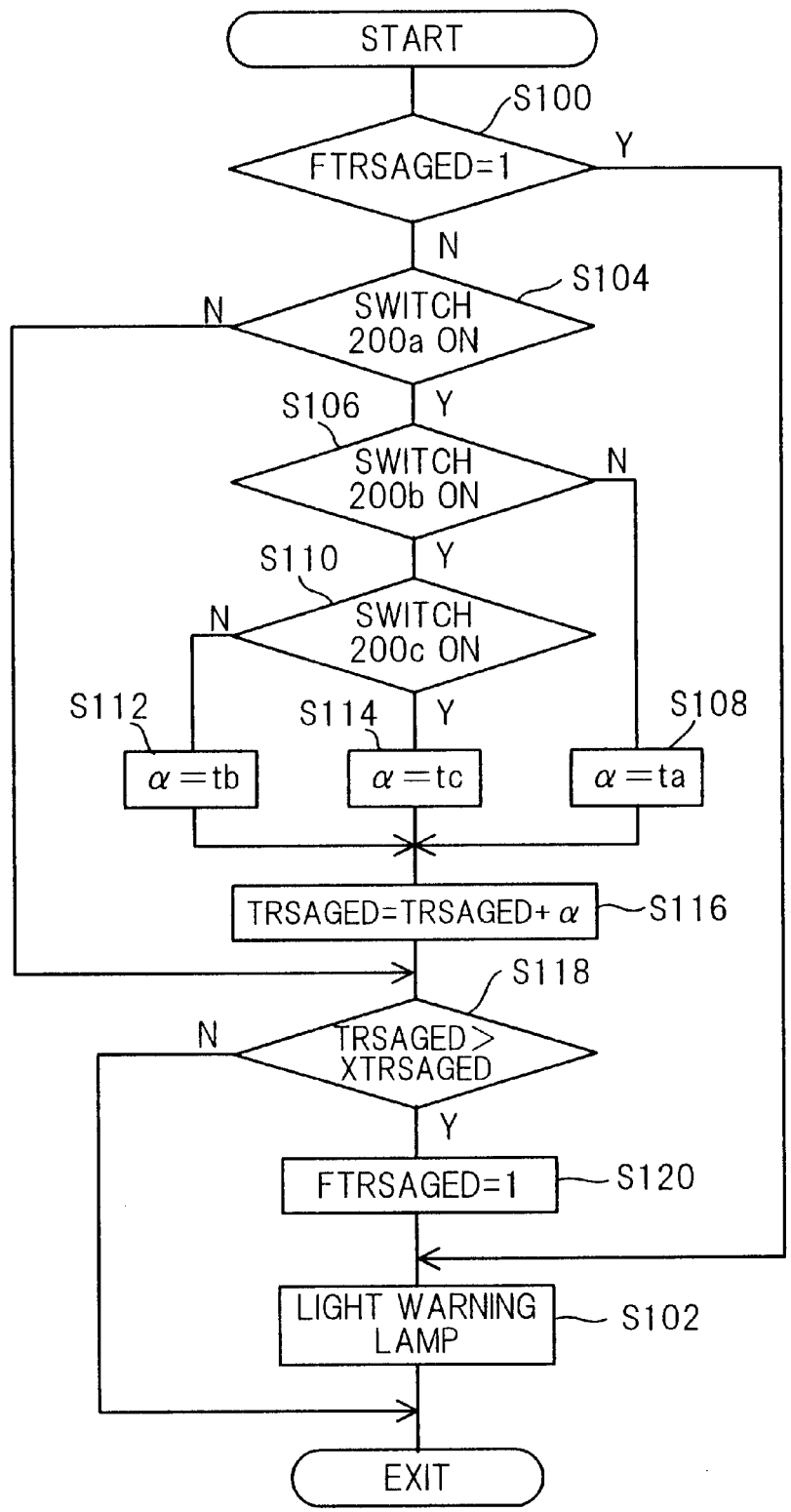
FIG. 11 is a view, partially similar to FIG. 1, but showing the configuration of the degradation discrimination system of an internal combustion engine exhaust gas purification system according to a second embodiment of this invention.

FIG. 11 is a view, similar to FIG. 8, but showing the operation of the system according to the second embodiment of the invention. The program in FIG. 11 is also executed when the ignition switch (not shown) is made on and is looped once every 100 msec.

Explaining this with focus on the differences from the first embodiment, when the result in S100 is negative, the program proceeds to S104 in which it is determined whether the first switch 200*a* has turned its output from OFF to ON state, in other words, it is determined whether the adsorbent temperature has reached 1100° C.

When the result in S104 is affirmative, the program proceeds to S106 in which it is determined whether the second switch 200*b* has turned its output from OFF to ON state, in other words, it is determined whether the adsorbent temperature has reached 1150° C. When the result is negative, the program proceeds to S108 in which the index (indicative of the degree of degradation progress) $\alpha$ is set to ta.

When the result in S106 is affirmative, the program proceeds to S110 in which it is determined whether the third switch 200*c* has turned its output from OFF to ON state, in other words, it is determined whether the adsorbent temperature has reached 1200° C. When the result is negative, the program proceeds to S112 in which the index $\alpha$ is set to tb, while when the result is affirmative, the program proceeds to S114 in which the index $\alpha$ is set to tc.

In the second embodiment, thus, the index $\alpha$ is determined not as a table-retrieval, but is determined as a group of three fixed values. The magnitude of the values are: ta<tb<tc. The program then proceeds to S116 in which the index $\alpha$ is added to the parameter TRSAGED. When the result in S104 is negative, the program skips S106 to S114.

Then program then proceeds to S118 in which it is determined whether the accumulated parameter TRSAGED exceeds the threshold value XTRSAGED and if it does, the program proceeds to S120 and S102 in which the same procedures as the first embodiment are taken.

In the second embodiment, instead of the temperature sensor, the temperature switches 200 are used which generates ON signals at the predetermined adsorbent temperatures. The temperature switches 200 are less expensive than the temperature sensor 104 used in the first embodiment, and are excellent in service life and are reliable in detection accuracy.

Thus, the system according to the second embodiment are simpler in configuration than the first embodiment, but can discriminate the degradation of the adsorbent accurately.

Figure 12:
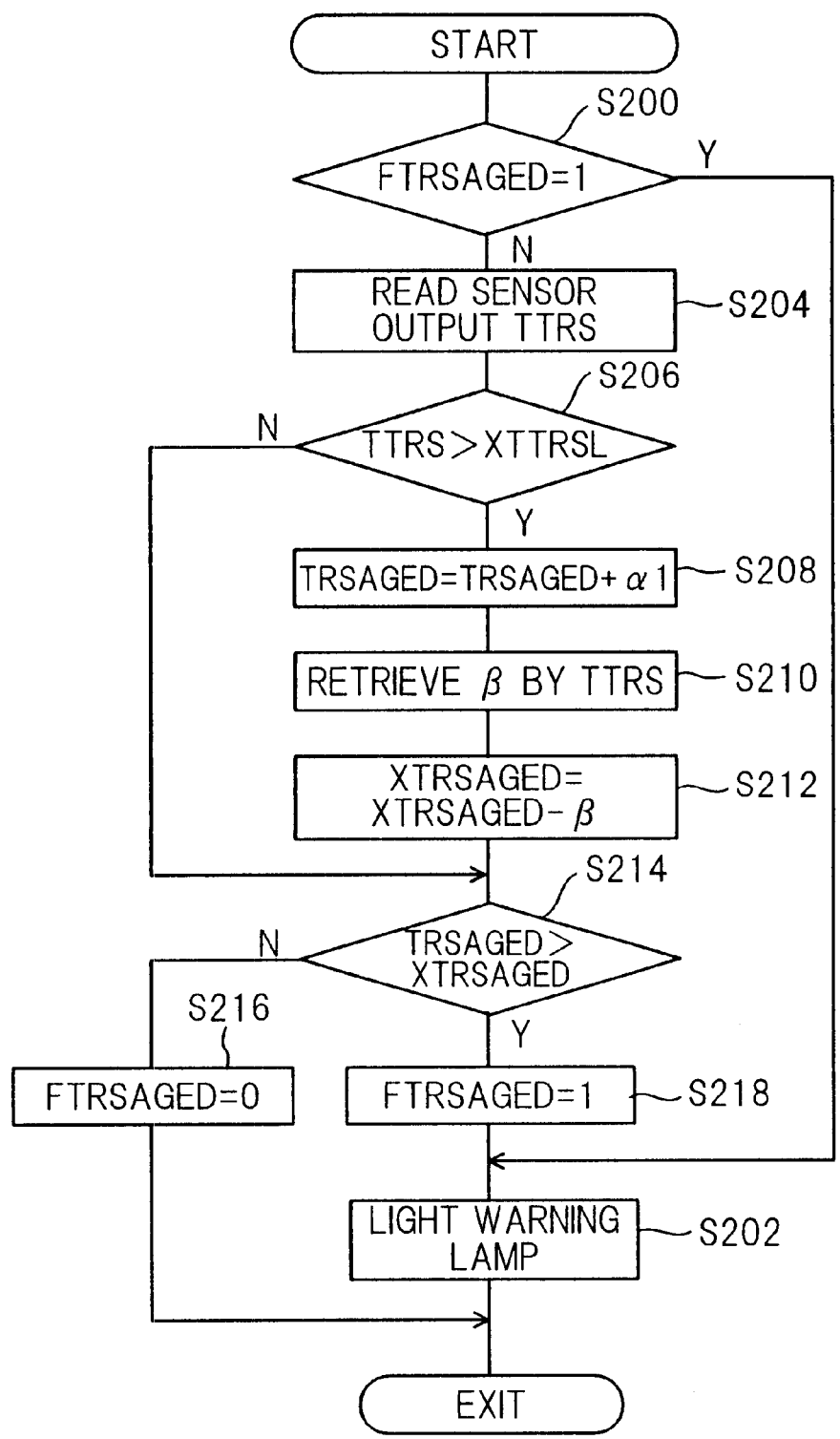
FIG. 12 is a flow chart, similar to FIG. 8, but showing the operation of the degradation discrimination system of an internal combustion engine exhaust gas purification system according to a third embodiment of this invention.

FIG. 12 is a view, similar to FIG. 8, but showing the operation of a degradation discrimination system of an internal combustion engine exhaust gas purification system according to a third embodiment of the invention. The program in FIG. 12 is also executed when the ignition switch (not shown) is made on and is looped once every 100 msec.

Explaining this with focus on the differences from the first embodiment, when the result in S200 is negative, the program proceeds, via S204, to S206 and if the result is affirmative, proceeds to S208 in which a predetermined value (fixed amount) $\alpha 1$ is added to the degradation discrimination parameter TRSAGED such that the parameter TRSAGED is accumulated or updated.

The program then proceeds to S210, a value $\beta$ is determined by retrieving table data (whose characteristic is shown in FIG. 13) using the detected adsorbent temperature TTRS as address data. Similar to the value $\alpha$, the value $\beta$ is the index indicative of the degree of degradation progress of the adsorbent 74 and is determined in such a way that it increases with increasing surplus (exceeding the marginal temperature XTTRSL).

The program then proceeds to S212 in which the determined value $\beta$ is subtracted from the degradation discrimination threshold value XTRSAGED to correct the same. The program then proceeds to S214 and on in which the same procedures as the foregoing embodiments are taken.

In the third embodiment, threshold value XTRSAGED is corrected or varied in response to the degree of degradation progress $\beta$, more specifically, by decreasing the threshold value with increasing the degree of degradation progress, while making the index $\alpha 1$ constant. With this, the same purpose as the first and second embodiments can be achieved.

In the first and second embodiments, it should be noted that, although the index $\alpha$ is simply added or accumulated to the parameter TRSAGED, it is alternatively possible to calculate a weighted average between the current and last indices and to add or accumulate the same. The same will similar be applied to the subtraction of $\beta$ in the third embodiment.

It should also be noted that, in the first to third embodiments, the number or location of the temperature sensor 104 or the temperature switches 200 should not be limited to the disclosure. For example, two temperature sensors can be used in the first embodiment to determine the adsorbent temperature from an average of the sensor outputs.

The first to third embodiments are thus configured to have a system for discriminating degradation of an exhaust purification system of an internal combustion engine (10) having an adsorbent (74) installed at a bypass exhaust gas passage (56) adsorbing unburned HC in exhaust gas generated by the engine, comprising: adsorbent temperature detecting means (temperature sensor 104, temperature switches 200, S14, S104, S106, S110, S204) for detecting a temperature of the adsorbent (TTRS); accumulated time period determining means (ECU 114, S16–S20, S108, S112, S114, S116, S206–S212) for accumulating a period of time (index $\alpha$, more precisely degradation discrimination parameter TRSAGED, index $\beta$) during which the detected adsorbent temperature (TTRS) exceeds a predetermined temperature (XTTRSL); and adsorbent degradation discriminating means (ECU 114, S22–S26, S118, S120, S214–S218) for discriminating whether the adsorbent has degraded based on the accumulated period of time.

In the system, the adsorbent degradation discriminating means includes: comparing means (ECU 114, S22–S26, S118–S120, S214–S218) for comparing the accumulated period of time (TRSAGED) with a threshold value (XTRSAGED); and discriminates whether the adsorbent has degraded based on a result of comparison. Specifically, the adsorbent degradation discriminating means discriminates that the adsorbent has degraded when the accumulated period of time exceeds the threshold value.

In the system, the accumulated period of time is corrected by the detected adsorbent temperature (ECU 114, S18–S20, S10–S116).

In the system, the threshold value is corrected by the detected adsorbent temperature (ECU 114, S206–S212).

In the system, the adsorbent degradation discriminating means lights a warning lamp (114) when the adsorbent is discriminated to be degraded (ECU 114, S12, S102, S202).

The first and second embodiments are configured to have a system for discriminating degradation of an exhaust purification system of an internal combustion engine (10) having an adsorbent (74) installed at a bypass exhaust gas passage (56) adsorbing unburned HC in exhaust gas generated by the engine, comprising: adsorbent temperature detecting means (temperature sensor 104, temperature switches 200, ECU 114, S14, S104, S106, S110) for detecting a temperature of the adsorbent (TTRS); degradation progress degree index determining (ECU 114, S16–S18, S104–S114) for comparing the detected adsorbent temperature with a predetermined temperature (XTTRSL) and when the detected adsorbent temperature exceeds a predetermined temperature, determining an index indicative of a degree of degradation progress ($\alpha$, i.e., TRSAGED) based on a surplus exceeding the predetermined temperature; accumulated index determining means (ECU 114, S20, S116) for accumulating the index; and adsorbent degradation discriminating means (ECU 114, S22–S26, S118–S120) for discriminating whether the adsorbent has degraded based on the accumulated index.

In the system, the adsorbent degradation discriminating means includes: comparing means (ECU 114, S22, S118) for comparing the index with a threshold value (XTRSAGED); and discriminates that the adsorbent has degraded when the accumulated index exceeds the threshold value.

The third embodiment is configured to have a system for discriminating degradation of an exhaust purification system of an internal combustion engine (10) having an adsorbent (74) installed at a bypass exhaust gas passage (56) adsorbing unburned HC in exhaust gas generated by the engine, comprising: adsorbent temperature detecting means (temperature sensor 104, ECU 114, S10) for detecting a temperature of the adsorbent (TTRS); accumulated time period determining means (ECU 114, S206–S208) for comparing the detected adsorbent temperature (TTRS) with a predetermined temperature (XTTRSL) and accumulating a period of time (TRSAGED+$\alpha$) during which the detected adsorbent temperature exceeds the predetermined temperature; degradation progress degree index determining (ECU 114, S210–S212) for determining an index indicative of a degree of degradation progress ($\beta$) based on a surplus exceeding the predetermined temperature when the detected adsorbent temperature exceeds the predetermined temperature, threshold value determining means (ECU 114, S212) for determining a threshold value (XTRSAGED) based on the index; and adsorbent degradation discriminating means (ECU 114, S214–S218) for discriminating whether the adsorbent has degraded based on the accumulated index.

In the system, the adsorbent degradation discriminating means includes: comparing means (ECU 114, S214) for comparing the index with the threshold value; and discriminates that the adsorbent has degraded when the accumulated index exceeds the threshold value.

In the system, the adsorbent degradation discriminating means lights a warning lamp (144) when the adsorbent is discriminated to be degraded (ECU 114, S202).

It should also be noted that the switch-over valve may be opened or closed by an electric actuator.

It should further be noted that the adsorbent should not be limited to the type disclosed, any other type may be used if it has an excellent heat-proof property.

While the invention has thus been shown and described with reference to specific embodiments, it should be noted that the invention is in no way limited to the details of the described arrangements, changes and modifications may be made without departing from the scope of the appended claims.

What is claimed is:

1. A system for discriminating degradation of an exhaust purification system of an internal combustion engine having an adsorbent installed at a bypass exhaust gas passage adsorbing unburned HC in exhaust gas generated by the engine, comprising:

adsorbent temperature detecting means for detecting a temperature of the adsorbent;

accumulated time period determining means for accumulating a period of time during which the detected adsorbent temperature exceeds a predetermined temperature; and adsorbent degradation discriminating means for discriminating whether the adsorbent has degraded based on the accumulated period of time.

2. A system according to claim 1, wherein the adsorbent degradation discriminating means includes:

comparing means for comparing the accumulated period of time with a threshold value;

and discriminates whether the adsorbent has degraded based on a result of comparison.

3. A system according to claim 2, wherein the adsorbent degradation discriminating means discriminates that the adsorbent has degraded when the accumulated period of time exceeds the threshold value.

4. A system according to claim 1, wherein the accumulated period of time is corrected by the detected adsorbent temperature.

5. A system according to claim 1, wherein the threshold value is corrected by the detected adsorbent temperature.

6. A system according to claim 1, wherein the adsorbent degradation discriminating means lights a warning lamp when the adsorbent is discriminated to be degraded.

7. A system for discriminating degradation of an exhaust purification system of an internal combustion engine having an adsorbent installed at a bypass exhaust gas passage adsorbing unburned HC in exhaust gas generated by the engine, comprising:

adsorbent temperature detecting means for detecting a temperature of the adsorbent;

degradation progress degree index determining for comparing the detected adsorbent temperature with a predetermined temperature and when the detected adsorbent temperature exceeds a predetermined temperature, determining an index indicative of a degree of degradation progress based on a surplus exceeding the predetermined temperature;

accumulated index determining means for accumulating the index; and adsorbent degradation discriminating means for discriminating whether the adsorbent has degraded based on the accumulated index.

8. A system according to claim 7, wherein the adsorbent degradation discriminating means includes:

comparing means for comparing the index with a threshold value;

and discriminating that the adsorbent has degraded when the accumulated index exceeds the threshold value.

9. A system according to claim 7, wherein the adsorbent temperature detecting means is a temperature sensor installed at the adsorbent.

10. A system according to claim 7, wherein the adsorbent temperature detecting means is temperature switches installed at the adsorbent which changes their output at different temperatures.

11. A system according to claim 7, wherein the adsorbent degradation discriminating means lights a warning lamp when the adsorbent is discriminated to be degraded.

12. A system for discriminating degradation of an exhaust purification system of an internal combustion engine having an adsorbent installed at a bypass exhaust gas passage adsorbing unburned HC in exhaust gas generated by the engine, comprising:

adsorbent temperature detecting means for detecting a temperature of the adsorbent;

accumulated time period determining means for comparing the detected adsorbent temperature with a predetermined temperature and accumulating a period of time during which the detected adsorbent temperature exceeds the predetermined temperature;

degradation progress degree index determining for determining an index indicative of a degree of degradation progress based on a surplus exceeding the predetermined temperature when the detected adsorbent temperature exceeds the predetermined temperature, threshold value determining means for determining a threshold value based on the index; and adsorbent degradation discriminating means for discriminating whether the adsorbent has degraded based on the accumulated index.

13. A system according to claim 12, wherein the adsorbent degradation discriminating means includes:

comparing means for comparing the index with the threshold value;

and discriminating that the adsorbent has degraded when the accumulated index exceeds the threshold value.

14. A system according to claim 12, wherein the adsorbent degradation discriminating means lights a warning lamp when the adsorbent is discriminated to be degraded.

15. A method of discriminating degradation of an exhaust purification system of an internal combustion engine having an adsorbent installed at a bypass exhaust gas passage adsorbing unburned HC in exhaust gas generated by the engine, comprising the steps for:

detecting a temperature of the adsorbent;

accumulating a period of time during which the detected adsorbent temperature exceeds a predetermined temperature; and discriminating whether the adsorbent has degraded based on the accumulated period of time.

16. A method according to claim 15, wherein the step for adsorbent degradation discriminating includes the step for:

comparing the accumulated period of time with a threshold value;

and discriminating whether the adsorbent has degraded based on a result of comparison.

17. A method according to claim 16, wherein the step for adsorbent degradation discrimination discriminates that the adsorbent has degraded when the accumulated period of time exceeds the threshold value.

18. A method according to claim 15, wherein the accumulated period of time is corrected by the detected adsorbent temperature.

19. A method according to claim 15, wherein the threshold value is corrected by the detected adsorbent temperature.

20. A method according to claim 15, wherein the step for adsorbent degradation discriminating lights a warning lamp when the adsorbent is discriminated to be degraded.

21. A method of discriminating degradation of an exhaust purification system of an internal combustion engine having an adsorbent installed at a bypass exhaust gas passage adsorbing unburned HC in exhaust gas generated by the engine, comprising the steps for:

detecting a temperature of the adsorbent;

comparing the detected adsorbent temperature with a predetermined temperature and when the detected adsorbent temperature exceeds a predetermined temperature, determining an index indicative of a degree of degradation progress based on a surplus exceeding the predetermined temperature;

accumulating the index; and discriminating whether the adsorbent has degraded based on the accumulated index.

22. A method according to claim 21, wherein the step for adsorbent degradation discriminating includes the step for:

comparing the index with a threshold value;

and discriminating that the adsorbent has degraded when the accumulated index exceeds the threshold value.

23. A method according to claim 21, wherein the adsorbent temperature is detected by a temperature sensor installed at the adsorbent.

24. A method according to claim 21, wherein the adsorbent temperature is detected by temperature switches installed at the adsorbent which changes their output at different temperatures.

25. A method according to claim 21, wherein the step for adsorbent degradation discriminating lights a warning lamp when the adsorbent is discriminated to be degraded.

26. A method of discriminating degradation of an exhaust purification system of an internal combustion engine having an adsorbent installed at a bypass exhaust gas passage adsorbing unburned HC in exhaust gas generated by the engine, comprising the steps for:

detecting a temperature of the adsorbent;

comparing the detected adsorbent temperature with a predetermined temperature and accumulating a period of time during which the detected adsorbent temperature exceeds the predetermined temperature;

determining an index indicative of a degree of degradation progress based on a surplus exceeding the predetermined temperature when the detected adsorbent temperature exceeds the predetermined temperature, determining a threshold value based on the index; and discriminating whether the adsorbent has degraded based on the accumulated index.

27. A method according to claim 26, wherein the step of adsorbent degradation discriminating includes the step for:

comparing the index with the threshold value;

and discriminating that the adsorbent has degraded when the accumulated index exceeds the threshold value.

28. A method according to claim 26, wherein the step for adsorbent degradation discriminating lights a warning lamp when the adsorbent is discriminated to be degraded.

* * * * *